US011115369B1

(12) United States Patent
Schuler et al.

(10) Patent No.: US 11,115,369 B1
(45) Date of Patent: Sep. 7, 2021

(54) TRANSMITTING NEAR REAL-TIME GEOGRAPHIC MASS MESSAGING REQUESTS

(71) Applicant: MOTOROLA SOLUTIONS, INC., Chicago, IL (US)

(72) Inventors: Francesca Schuler, Palatine, IL (US); James C. Duran, Palatine, IL (US); Jonathan Solomon, Longmont, CO (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/942,473

(22) Filed: Jul. 29, 2020

(51) Int. Cl.
*H04L 12/58* (2006.01)
*H04W 4/021* (2018.01)
*H04W 76/18* (2018.01)
*H04W 4/06* (2009.01)

(52) U.S. Cl.
CPC ............ *H04L 51/26* (2013.01); *H04L 51/043* (2013.01); *H04L 51/14* (2013.01); *H04W 4/021* (2013.01); *H04W 4/06* (2013.01); *H04W 76/18* (2018.02)

(58) Field of Classification Search
None
See application file for complete search history.

(56) References Cited

U.S. PATENT DOCUMENTS

| | | | |
|---|---|---|---|
| 6,778,818 B1 | 8/2004 | O'Neil | |
| 8,424,094 B2 | 4/2013 | Neystadt et al. | |
| 9,191,992 B2 | 11/2015 | Dimitri et al. | |
| 9,307,385 B2 | 4/2016 | Best | |
| 2004/0203562 A1* | 10/2004 | Kolsrud | H04L 12/1895 455/404.1 |
| 2006/0184373 A1 | 8/2006 | Kumhyr | |
| 2008/0003941 A1* | 1/2008 | Milstein | H04L 67/30 455/3.01 |
| 2012/0023178 A1* | 1/2012 | Drevon | H04L 12/1895 709/206 |
| 2014/0357234 A1* | 12/2014 | Sullivan | H04L 67/10 455/412.1 |
| 2015/0026271 A1 | 1/2015 | Cheong et al. | |
| 2016/0071113 A1 | 3/2016 | Papanicolaou et al. | |
| 2020/0196125 A1 | 6/2020 | Schuler et al. | |

* cited by examiner

*Primary Examiner* — Brian Whipple
(74) *Attorney, Agent, or Firm* — Michael Best & Friedrich LLP

(57) ABSTRACT

Systems and methods for transmitting near real-time geographic mass messaging requests. One example method includes receiving a geographic mass messaging request via a transceiver, the geographic mass messaging request including a message, a geographic reference, and a requesting agency identifier, and having at least one request characteristic. The method includes assigning, with an electronic processor, a priority to the geographic mass messaging request based on an electronically stored alerting authority policy and at least one selected from the group consisting of the requesting agency identifier, the geographic reference, and the at least one request characteristic. The method includes, responsive to determining that the priority does not meet a priority threshold, transmitting one of a request denied message and a request modification proposal via the transceiver to the requesting agency.

20 Claims, 5 Drawing Sheets

TABLE 1. POLICIES: AGENCY TO INITIATE EVIDENCE COLLECTION REQUEST

| CATEGORY | INITIATING AGENCY |
|---|---|
| TIP | RTCC / PD |
| 911 CALL (PRIORITY AND INCIDENT TYPE DEPENDENCY) | PSAP OR RTCC / PD (SEE TABLE 2) |
| CITIZEN SERVICE REQUEST | PUBLIC WORKS |

TABLE 2. POLICIES: INCIDENT TYPES/PRIORITIES ENABLED, TIMING WINDOW, GEOFENCE SIZE (EVIDENCE COLLECTION REQUESTS)

| INCIDENT TYPE & PRIORITY/SEVERITY | ENABLED & INITIATING AGENCY | AVAILABLE WINDOW FOR REQUEST (FROM TIME OF RECORD ENTRY) | GEO-FENCE SIZE |
|---|---|---|---|
| 3-ALARM FIRE | YES - RTCC / PD | 3 HOURS | 2 SQUARE MILES |
| BOMBING - CITY BOMBING - RURAL | YES - PSAP | 5 HOURS | 2 SQUARE MILES 5 SQUARE MILES |
| ACTIVE SHOOTER | YES - PSAP | 10 HOURS | 5 SQUARE MILES |
| TRAFFIC ACCIDENT PRIORITY 3 | NO | N/A | N/A |

FIG. 4

TRANSMITTING NEAR REAL-TIME GEOGRAPHIC MASS MESSAGING REQUESTS

BACKGROUND OF THE INVENTION

Much of the general public carry wireless communication devices, for example, smart telephones, throughout the day. These devices operate using cellular or other wireless communication networks to provide voice, broadband, and other capabilities to their users. In the event of imminent threat incidents, for example, active shooter situations, natural disasters, and hazardous weather conditions, it is desirable to alert members of the public who may be affected by such threat incidents. The wireless communication devices and networks can be used by government agencies and other alerting authorities to provide mass notification of the threats to the public. For example, the Integrated Public Alert and Warning System (IPAWS) allows alerting authorities to send wireless emergency alerts to people located within a particular geographic area. Using such systems, it is not necessary for the alerting authorities to have a database of recipients to send the alerts. The alerts are sent to all devices operating in a specified geographic area (for example, the area surrounding the imminent threat incident). Such systems may also be used to transmit mass alerts relating to non-imminent threat incidents.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 4 is a table illustrating aspects of the operation of the system of FIG. 1 in accordance with some embodiments.

Figure 1:
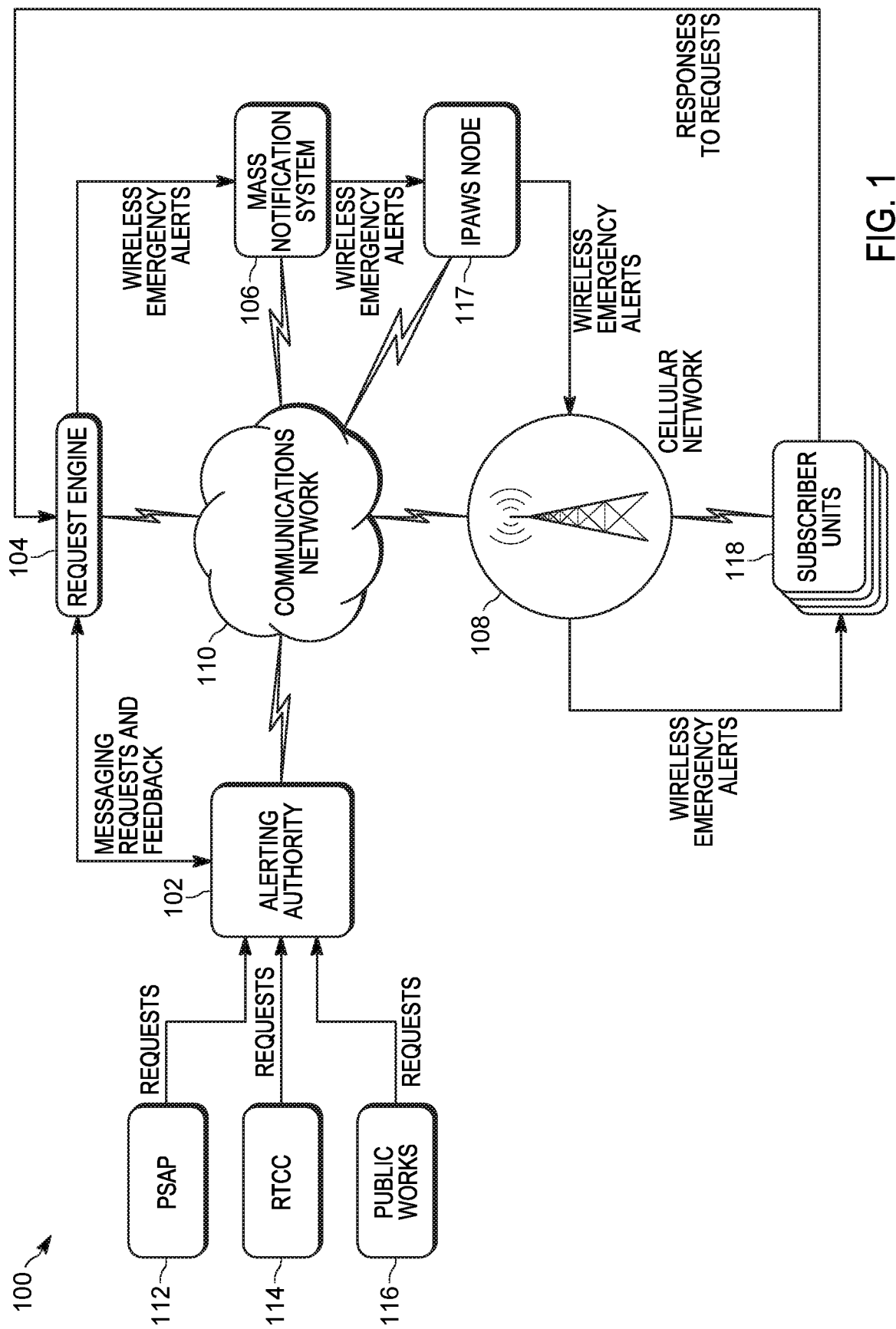
FIG. 1 illustrates a wireless messaging system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

As noted above, cellular and other wireless communication devices and networks can be used by alerting authorities to provide mass notification of threats to the public. The Integrated Public Alert and Warning System (IPAWS), in particular, may be used by alerting authorities to send wireless emergency alerts. Wireless emergency alerts are sent to all wireless communication devices operating within a particular geographic area (for example, as specified by a geofence).

It is not necessary for the alerting authorities to have a database of recipients. Alerts are sent to all devices operating in a specified geographic area (for example, the area surrounding the imminent threat incident). Such systems may also be used to transmit mass alerts relating to non-imminent threat incidents, enabling government agencies to quickly gather useful information. For example, when a crime has occurred, wireless emergency alerts may be used to quickly notify many people in the area surrounding the crime. If the alerts are accompanied by a request for the recipients to submit information, they can be used to collect evidence and other relevant information about the crime.

However, incidents that could trigger these requests for information are more numerous than imminent threat incidents. Furthermore, multiple requesting agencies may cover the same or overlapping geographic areas. If each non-imminent threat incident was the basis of a wireless emergency alert, communications systems and/or the recipients of such alerts could become overloaded with alerts. Recipients of these numerous alerts, when not all "emergency alerts" are truly emergencies, may further become desensitized to them. This could result in a low response rate to the alerts. In addition, a large quantity of alerts about non-imminent threat incidents may prevent the timely transmission of alerts about imminent threat incidents. Accordingly, systems and methods are provided herein for prioritizing and transmitting near real-time geographic mass messaging requests.

Embodiments described herein provide, among other things, a request engine, which utilizes rule-based policies to prioritize requests for wireless emergency alerts in order to avoid overwhelming the system and citizen targets. Among other things, embodiments of the request engine act as a clearing house for real-time or near real-time geographic mass messaging requests. The request engine prioritizes certain alerts over others based on policies and other factors, including the requesting agency, the incident type, the requested broadcast area, and existing or recently issued alerts for the same, similar, or overlapping times and areas. The request engine transmits or denies requests based on priority, and suggests or requires modifications to requested time frames or geographic areas in light of the policy, the current state of the system, and historical alert data.

Among other things, using such embodiments, alert requests from multiple entities can be prioritized and transmitted without overwhelming the available infrastructure. This improvement, in turn, leads to improved operation of the wireless networks, more reliable collection of information, more efficient use of the networks and their respective computing resources, and the reservation of resources for predicted higher priority mass-messaging events, among other benefits.

One example embodiment provides a system for transmitting near real-time geographic mass messaging requests. The system includes a memory, a transceiver, and an electronic processor communicatively coupled to the memory and the transceiver. The electronic processor is configured to receive a geographic mass messaging request via the transceiver. The geographic mass messaging request includes a message, a geographic reference, and a requesting agency identifier, and having at least one request characteristic. The electronic processor is configured to assign a priority to the geographic mass messaging request based on an electronically stored alerting authority policy and at least one selected from the group consisting of the requesting agency identifier, the geographic reference, and the at least one request characteristic. The electronic processor is configured to, responsive to determining that the priority meets a priority threshold, transmit the message via the transceiver to a mass notification system for broadcast to end user devices in a specified geographic region based on the geographic reference. The electronic processor is configured to transmit a request granted message via the transceiver to the requesting agency. The electronic processor is configured to, responsive to determining that the priority does not meet the priority threshold, transmit one of a request denied message and a request modification proposal via the transceiver to the requesting agency.

Another example embodiment provides a method for transmitting near real-time geographic mass messaging requests. The method includes receiving a geographic mass messaging request via a transceiver, the geographic mass messaging request including a message, a geographic reference, and a requesting agency identifier, and having at least one request characteristic. The method includes assigning, with an electronic processor, a priority to the geographic mass messaging request based on an electronically stored alerting authority policy and at least one selected from the group consisting of the requesting agency identifier, the geographic reference, and the at least one request characteristic. The method includes, responsive to determining that the priority does not meet a priority threshold, transmitting one of a request denied message and a request modification proposal via the transceiver to the requesting agency.

For ease of description, some or all of the example systems presented herein are illustrated with a single exemplar of each of its component parts. Some examples may not describe or illustrate all components of the systems. Other example embodiments may include more or fewer of each of the illustrated components, may combine some components, or may include additional or alternative components.

FIG. 1 is a block diagram of an example wireless messaging system 100. FIG. 1 shows one example of a networked configuration, in which embodiments may be implemented; other configurations are possible. In the example shown, the system 100 includes an alerting authority 102, a request engine 104, a mass notification system 106, and a cellular network 108. It should be understood that the system 100 is provided as one example and, in some embodiments, the system 100 may include fewer or additional components. For example, the system 100 may include multiple alerting authorities 102, multiple mass notification systems 106, and multiple cellular networks 108, or combinations thereof. As would be understood by one skilled in the art, FIG. 1 is a simplified diagram and networks are more complex than the schematic elements depicted in FIG. 1.

The alerting authority 102, request engine 104, mass notification system 106, and cellular network 108 are communicatively coupled to one another via a communications network 110. The communications network 110 is a communications network including wireless connections, wired connections, or combinations of both. The communications network 110 may be implemented using a wide area network, for example, the Internet, a local area network, for example, a Bluetooth™ network or Wi-Fi, a Long Term Evolution (LTE) network, a Global System for Mobile Communications (or Groupe Special Mobile (GSM)) network, a Code Division Multiple Access (CDMA) network, an Evolution-Data Optimized (EV-DO) network, an Enhanced Data Rates for Global Evolution (EDGE) network, a 3G network, a 4G network, 5G network, and combinations or derivatives thereof.

In FIG. 1, the alerting authority 102 represents the hardware and telecommunications infrastructure of an alerting authority. An alerting authority is an entity authorized to send wireless emergency alerts (WEA) using the mass notification system 106. Examples of alerting authorities include local governments, state governments, and the US federal government. As noted above, alerting authorities may send out alerts for both imminent and non-imminent threat incidents. The alerting authority 102 receives requests to send such alerts from various subordinate entities. As illustrated in FIG. 1, examples of entities that submit alert requests include a public safety answering point 112, a Real Time Crime Center (RTCC) 114, and a public works department 116. The entities are communicatively coupled to the alerting authority 102 using a wired connection, a wireless connection, or combinations of both. Any one of the entities may submit a request for an alert, for example, using a suitable electronic communication protocol or an API for sending and receiving such requests. For example, the RTCC 114 may be seeking witnesses to a crime that occurred recently in a particular area. In another example, the PSAP 112 may have received a 911 call about a missing person and be seeking reports from anyone in the surrounding area who may have information about the missing person. In each example, sending an alert to all portable electronic devices within the area asking operators of those devices to respond with relevant information could help to more quickly resolve the situation.

The alerting authority 102 receives an alert request from one of its entities and formulates a geographic mass messaging request based on the alert request. As set forth in detail herein, the geographic mass messaging request includes, among other things, a message to be broadcast as a wireless emergency alert and information about where the message should be broadcast. In order to prevent broadcasting too many alerts to the same area or in too short a time, the alerting authority 102 sends the geographic mass messaging request to the request engine 104 for prioritizing. In some embodiments, the alerting authority 102 sends the geographic mass messaging request to the request engine 104 using the Organization for the Advancement of Structured Information Standards (OASIS) Common Alerting Protocol (CAP).

Figure 2:
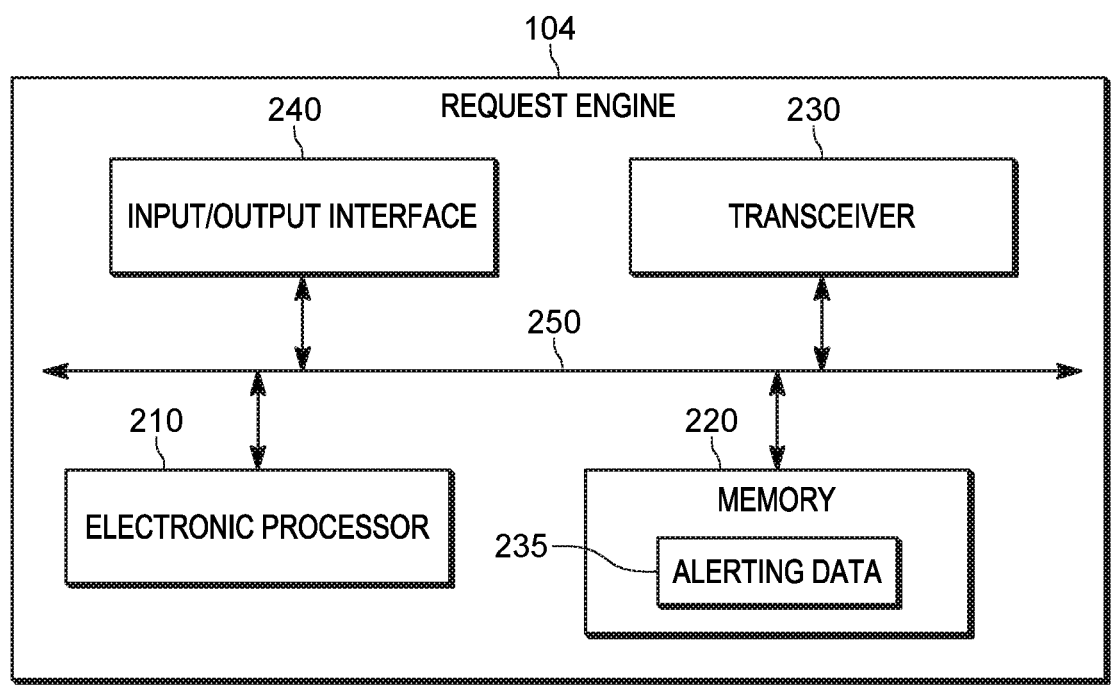
FIG. 2 schematically illustrates a request engine in accordance with some embodiments.

The request engine 104, described more particularly herein with respect to FIG. 2, receives geographic mass messaging requests from the alerting authority 102. The request engine 104 prioritizes the requests before submitting them to the mass notification system 106 for broadcasting. In some embodiments, the request engine 104 makes determinations regarding the geographic mass messaging requests, and sends feedback, including requested modifications to the geographic mass messaging requests, to the alerting authority 102. The request engine 104 stores or has access to historical data on geographic mass messaging request submissions and transmission patterns. As described herein, in some embodiments, the request engine 104 prioritizes the requests based in part on this historical data. As illustrated in FIG. 1, in some embodiments, the request engine 104 is a standalone component of the system 100. In some embodiments, the request engine 104 may be integrated into the alerting authority 102. In some embodiments, one or more request engines 104 work in concert to prioritize and transmit wireless emergency alerts based on geographic mass messaging request submissions from one or more alerting authorities 102.

In some embodiments, the request engine 104 uses various machine learning methods to analyze data to prioritize geographic mass messaging requests (as described herein). Machine learning generally refers to the ability of a computer program to learn without being explicitly programmed. In some embodiments, a computer program (for example, a learning engine) is configured to construct an algorithm based on inputs. Supervised learning involves presenting a computer program with example inputs and their desired outputs. The computer program is configured to learn a general rule that maps the inputs to the outputs from the training data it receives. Example machine learning engines include decision tree learning, association rule learning, artificial neural networks, classifiers, inductive logic programming, support vector machines, clustering, Bayesian networks, reinforcement learning, representation learning, similarity and metric learning, sparse dictionary learning, and genetic algorithms. Using these approaches, a computer program can ingest, parse, and understand data and progressively refine algorithms for data analytics.

Geographic mass messaging requests, once prioritized, are sent as wireless emergency alerts to the mass notification system 106. The mass notification system 106 includes hardware and software configured to coordinate the sending of wireless emergency alerts through cellular networks covering the applicable geographic areas. As illustrated in FIG. 1, the mass notification system 106 transmits (for example, via the communications network 110) wireless emergency alerts to an IPAWS (Integrated Public Alert and Warning System) Node 117. The IPAWS Node 117 transmits the wireless emergency alerts to the cellular network 108 for broadcast to one or more subscriber units 118. Based on the geographic area specified by the IPAWS Node 117 for a wireless emergency alert, one or more base stations of the cellular network 108 are selected, based on their coverage areas' relation to the specified geographic area, to broadcast the wireless emergency alert.

The cellular network 108 may operate according to an industry standard cellular protocol, for example, the Long Term Evolution (LTE) (including LTE-Advanced or LTE-Advanced Pro compliant with, for example, the 3GPP TS 36 specification series), or the 5G (including a network architecture compliant with, for example, the 3GPP TS 23 specification series and a new radio (NR) air interface compliant with the 3GPP TS 38 specification series) standard, among other possibilities, and over which, among other things, an open mobile alliance (OMA) push to talk (PTT) over cellular (OMA-PoC), a voice over IP (VoIP), or a PTT over IP (PoIP) application may be implemented.

The subscriber units 118 are portable communications devices including hardware and software configured to communicate via the cellular network 108 and to receive and respond to wireless emergency alerts. The subscriber units 118 may be, for example, smart telephones, mobile two-way radios, smart watches, laptop computers, tablet computers, or other similar devices capable of operating as described herein. The subscriber units 118 receive the wireless emergency alerts and present them, for example, on a display screen. In some embodiments, wireless emergency alerts include geofence or other geographic data describing the intended coverage area of the alert. In such embodiments, a subscriber unit receiving a wireless emergency alert may compare the geographic data to its current location (for example, as determined using a geolocation system contained in the subscriber unit) to determine whether it is within the intended coverage area prior to presenting the alert to an operator of the subscriber unit. Operators of the subscriber units 118, after reading the wireless emergency alerts, may respond to such alerts by transmitting requested information from the subscriber units 118 to, for example, the request engine 104 or the alerting authority 102. For example, text or multimedia messages may be sent to an electronic address provided for such responses.

FIG. 2 schematically illustrates one embodiment of the request engine 104. In the example illustrated, the request engine 104 includes an electronic processor 210, a memory 220, a transceiver 230, and an input/output interface 240. The electronic processor 210, the memory 220, the transceiver 230, and the input/output interface 240 communicate over one or more control and/or data buses (for example, a communication bus 250). In some embodiments, the request engine 104 is a computer server. FIG. 2 illustrates only one example embodiment of a request engine 104. The request engine 104 may include fewer or additional components and may perform functions other than those explicitly described herein.

In some embodiments, the electronic processor 210 is implemented as a microprocessor with separate memory, for example, the memory 220. In other embodiments, the electronic processor 210 may be implemented as a microcontroller (with memory 220 on the same chip). In other embodiments, the electronic processor 210 may be implemented using multiple processors. In addition, the electronic processor 210 may be implemented partially or entirely as, for example, a field-programmable gate array (FPGA), and application specific integrated circuit (ASIC), and the like and the memory 220 may not be needed or be modified accordingly. In the example illustrated, the memory 220 includes non-transitory, computer-readable memory that stores instructions that are received and executed by the electronic processor 210 to carry out functionality of the request engine 104 described herein. The memory 220 may include, for example, a program storage area and a data storage area. The program storage area and the data storage area may include combinations of different types of memory, for example, read-only memory and random-access memory. In the embodiment illustrated, the memory 220 stores, among other things, alerting data 235 (for example, geographic mass messaging requests, and policies relating to the transmission of geographic mass messaging requests (see FIG. 4).

The transceiver 230 send and receives communications to and from the request engine 104 and other components of the system 100.

The input/output interface 240 may include one or more input mechanisms (for example, a touch screen, a keypad, buttons, knobs, and the like), one or more output mechanisms (for example, a display, a printer, a speaker, and the like), or a combination thereof. The input/output interface 240 receives input from input devices actuated by a user and provides output to output devices with which the user interacts. In some embodiments, as an alternative or in addition to managing inputs and outputs through the input/output interface 240, the request engine 104 may receive user input, provide user output, or both by communicating with an external device, for example, a console computer, over a wired or wireless connection.

In some embodiments, one or more of the alerting authority 102 and the mass notification system 106, although having distinct functions and capabilities, include systems or devices having a similar general component configuration as the request engine 104, in that they each include a respective electronic processor, memory, transceiver, and input/output interface coupled by a communication bus.

Figure 3:
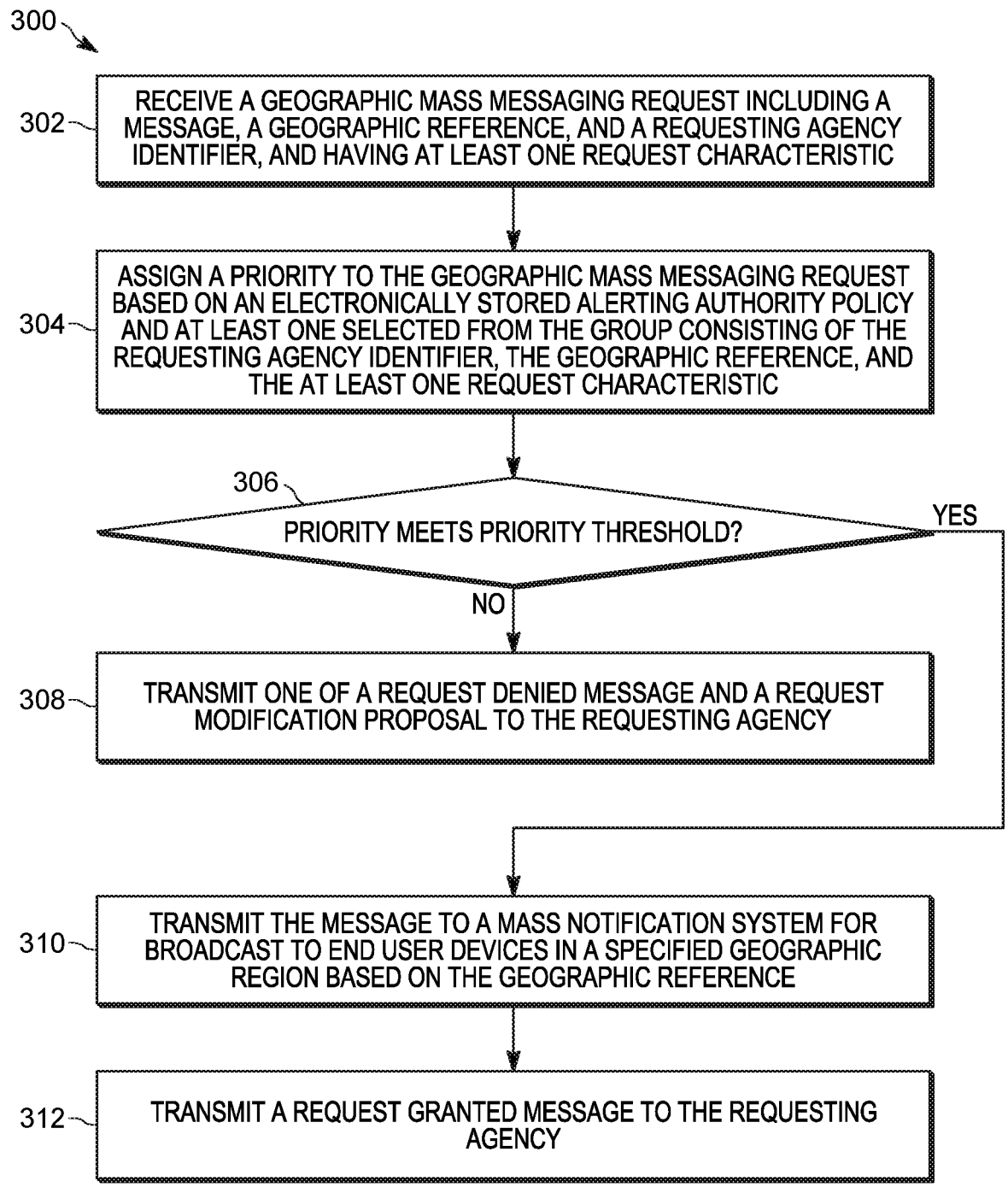
FIG. 3 is a flowchart illustrating a method for operating the request engine of FIG. 2 in accordance with some embodiments.

As noted, sending too many alerts to the same area may overwhelm recipients, tax the system, and/or result in diminishing returns. To prevent this, rather than transmitting all geographic mass messaging requests as received, the request engine 104 prioritizes the requests for transmission. In one example embodiment, the request engine 104 includes in the memory 220 message processing software, which, when executed, performs an example method 300 for transmitting near real-time geographic mass messaging requests (illustrated in FIG. 3). Although the method 300 is described in conjunction with the system 100 as described herein, the method 300 could be used with other systems and devices. In addition, the method 300 may be modified or performed differently than the specific example provided.

As an example, the method 300 is described as being performed by the request engine 104 and, in particular, the electronic processor 210. In some embodiments, the electronic processor 210 includes multiple electronic processors included in the request engine 104 that perform all or a portion of the method 300. Further, in some embodiments, the request engine 104 is a distributed controller in which processors of multiple devices cooperate to form the request engine 104 and perform its functionality.

At block 302, the electronic processor 210 receives (for example, via the transceiver 230), a geographic mass messaging request. For example, the electronic processor 210 may receive the geographic mass messaging request (for example, using a suitable electronic communication protocol or an application programming interface (API)) from the alerting authority 102. The geographic mass messaging request is an electronic message that includes a message to be sent as a wireless emergency alert, a geographic reference, and a requesting agency identifier. The message includes text that will be displayed on the devices receiving the wireless emergency alert (for example, "A crime has been reported in your area. The suspect was seen fleeing West from 123 Main Street at approximately 6:15 PM wearing a blue shirt and tan pants. If you have any information about the suspect or the crime, please text the information to 12345.")

The geographic reference is an indication of the particular geographic area where the message is to be broadcast. For example, the geographic reference may be a geofence outlining the broadcast area. In another example, the geographic reference may be an incident location (for example, the location or a reported crime or the last known location of a missing person). For example, the broadcast area may be defined by the coordinates of the incident location and a radius. In another example, the geographic reference may be the location of a requesting device (for example, a smart device used by a police officer to send a geographic mass messaging request relating to an incident, to which the officer is currently responding). For example, the broadcast area may be defined by the coordinates of the requesting device's location and a radius. In some embodiments where a radius is used to define a broadcast area, the radius may be specified as part of the geographic reference included in the request. In other embodiments where a radius is used to define a broadcast area, the radius may be a default radius. In some embodiments, default radii may be set based on incident type, the identity of the requesting device, the day, date, or time of the request, and other relevant considerations. In another example, the geographic reference may be a location based on the requesting agency identifier (for example, the jurisdictional area of a law enforcement agency or the boundaries of a city making a request). By identifying a geographic area for the mass messaging request, it is not necessary for the requesting agency to have or produce a database of individual recipients. Rather, alerts are sent to all devices operating in the specified geographic area (for example, the area surrounding the non-imminent threat incident).

The requesting agency identifier is a unique identifier (for example, an alphanumeric code) that identifies the entity requesting the wireless emergency alert. In some embodiments, the requesting agency identifier identifies the alerting authority. The requesting agency identifier may be an absolute agency identifier (that is, identifying the particular entity making the request) or an agency type identifier (that is, identifying the type of entity making the request).

The geographic mass messaging request also has at least one request characteristic. Request characteristics are characteristics of or information relevant to the geographic mass messaging request. Request characteristics may be explicit in (that is, part of) the geographic mass messaging request or may be inferred or determined by the request engine 104 (for example, using a machine learning or other algorithm). One example of a request characteristic is an evidence request policy, which specifies when, where, how, and by whom requests for evidence may be made using wireless emergency alerts. Evidence request policies may be created by alerting authorities or other governmental entities. Another example of a request characteristic is a timing window. In some embodiments, a timing window indicates for how long from an incident occurrence a request to collect information about the incident may be made. In some embodiments, the timing window is an indication of when the event prompting the request occurred. Another example of a request characteristic is an incident type, which categorizes the incident that is the subject of the geographic mass messaging request. In some embodiments, a request characteristic partially describes the request relative to other requests. For example, the request characteristic may identify at least one existing queued message having a shared request characteristic with the geographic mass messaging request. For example, there may be another geographic mass messaging request, which has already been prioritized for transmission, that has an overlapping time window, is of the same incident type, or is otherwise similar in nature to the received request.

At block 304, the electronic processor 210 assigns a priority to the geographic mass messaging request. In some embodiments, the priority is a numerical value (for example, a decimal number, an integer, or a percentile) that indicates when, relative to other geographic mass messaging requests, this geographic mass messaging request should be transmitted for broadcast. For example, where two geographic mass messaging requests are being compared, the one having the higher priority would be transmitted before the one having the lower priority. In some embodiments the priority may be expressed as a range (for example, low, medium, or high).

The electronic processor 210 determines the priority based on an electronically stored alerting authority policy and at least one of the requesting agency identifier, the geographic reference, and the at least one request characteristic. FIG. 4 includes a chart 400, illustrating some example policies. In some embodiments, the policies are generated by the alerting authorities (for example, local governments, state governments, the federal government, or subunits thereof). Policies may also be generated by intergovernmental agreement (for example, the local governments making up a county may agree on policies limiting the types, quantities, and timing of alerts that may be submitted by requesting entities within the county. In some embodiments, applicable policies are stored in databases operated by alerting authorities and accessed by the request engine 104. In some embodiments, the request engine 104 receives and stores copies of the policies, for example in the form of the chart 400, which may be stored in the memory 220 as a lookup table (for example, as part of the alerting data 235), accessible by the electronic processor 210. In some embodiments, multiple alerting authorities provide their policy data a single request engine 104, which stores those policies in multiple local databases, multiple lookup tables, or other suitable data structures. In some embodiments, the electronic processor 210 uses the requesting agency identifier, the geographic reference, the at least one request characteristic, or combinations thereof to apply a policy to the geographic mass messaging request and assign a priority.

Table 1 of FIG. 4 includes example policies defining which agencies are allowed to initiate which types of requests (in the illustrated example, "evidence collection requests.") Request categories 402 are associated with initiating agency types 404. The request engine 104, using policy 405 to evaluate a geographic mass messaging request with an agency type identifier of "PUBLIC WORKS" for a request type other than "CITIZEN SERVICE REQUEST" may assign the request a lower priority, or may deny the request (effectively assigning the request a zero priority).

Table 2 of FIG. 4 includes example policies defining which incident types 406 can generate alerts, which agencies 408 are allowed to initiate which types of requests, time window limits 410, and geographic restrictions 412. For example, according to policy 414, a geographic mass messaging request with a request characteristic (incident type) of "ACTIVE SHOOTER" incident type may result in an alert being sent ("YES" indicates that alerting is enabled). The geographic mass messaging request for an "ACTIVE SHOOTER" incident type must include a requesting agency identifier (agency type identifier) of "PSAP." In addition, according to policy 414, such requests must be submitted within 10 hours of the incident and the geographic reference contained in the request should specify an area no larger than 5 square miles.

In some embodiments, geographic mass messaging requests that have request characteristics 406, agency identifiers 408, time windows 410, and geofence sizes 412, which match or are within the values given for applicable policy of Table 2 are assigned higher priorities than requests that do not match or exceed the values given for the applicable policy. For example, a request to send an alert based on a "3-ALARM FIRE" that includes a geographic reference specifying a geofence of 4 square miles may be assigned a lower priority than a similar request specifying a geofence of 1 square mile. In another example, when two requests of the same incident type are received, but one is outside the time window 410 for the applicable policy and the other is within the time window 410, the request within the time window may be assigned a higher priority than the request outside the time window.

In some embodiments, the priority is based on a priority assigned to the incident, which is the subject of the request, from the event workflow policy as defined for the computer aided dispatch system that tracks the incident. As noted, Table 2 of FIG. 4 includes example policies used to qualify and prioritize an event for notification. In some embodiments, incidents may be ranked in order of computer-aided dispatch assigned incident priority (for example, provided by the requesting entity as a request characteristic in the geographic mass messaging request), using incident impact as defined by time window 410 and geofence size 412 attributes for the corresponding incident type 406 to resolve tie scores. For example, in some embodiments, the length of the requested time window, the size of the requested geofence, or both, are used to apply a weight to the computer-aided dispatch assigned incident priority. For example, as illustrated in FIG. 4, the Active Shooter incident, even if assigned the same priority as the 3-Alarm Fire and the Bombing incidents, could have a greater impact in terms of requested time and geographic area. Applying weights for these factors would therefore assign a higher priority to the active shooter incident.

In some embodiments, in the case of multiple priority 1 alerts, and where a maximum capacity has been reached for a given area, a request for an exception is generated to the alerting authority (for example, an electronic message may be sent requesting to exceed the maximum capacity and send the alert immediately, rather than delaying or otherwise modifying the alert).

FIG. 4 illustrates one example format for alerting authority policies. Other formats are possible. In some embodiments, a pre-assigned priority value may be assigned for a request matching certain parameters. For example, a policy for a request including an armed robbery incident type requested by a Real Time Crime Center within 30 minutes of the incident for broadcast within 1 square mile may include a pre-assigned priority of 6 on a 10-point scale. The pre-assigned priorities may be modified by the request engine 104 based on other factors (for example, the agency identifier, the location of the incident, the time of day, the time since an alert was last sent to the requested broadcast area, and the like). For example, a request for an alert based on an armed robbery, as described above, would be assigned a priority of 6, but the priority may be increased (for example, to an 8) if the incident location was near senior citizen housing or if the incident took place during hours here crowds were typically present in the area near the incident. Similarly, the priority might be decreased (for example, to a 4) if the armed robbery occurred in a sparsely populated area.

At block 306, the electronic processor 210 compares the priority (determined at block 304) to a priority threshold. The priority threshold is a value used to determine whether or when a wireless emergency alert (based on the geographic mass messaging request) should be sent. The value of the priority threshold is set to prevent too many wireless emergency alerts from being sent to the same area in too short a time, as determined by the alerting authority or another applicable agency. In some embodiments, the priority threshold is an absolute threshold, which must be met before a wireless emergency alert is sent. For example, a geographic mass messaging request must have a priority of at least 0.6 on a 1-point scale in order to be sent. In another example, only geographic mass messaging requests assigned a high priority on a low/medium/high scale result in wireless emergency alerts being sent. In some embodiments, the priority threshold is a relative threshold. For example, a geographic mass messaging request must have a priority that exceeds the average priority of all pending requests by a particular amount in order to be sent. In some embodiments, a geographic mass messaging request must have a priority that meets or exceeds the average priority of the geographic mass messaging requests sent within the immediate past 24 hours in order to be sent. For example, the electronic processor 210 may keep a rolling average of the priorities of all mass messaging requests and compare the priority of the current mass messaging request to the rolling average to determine whether or not to send a wireless emergency alert based on the request.

Figure 5:
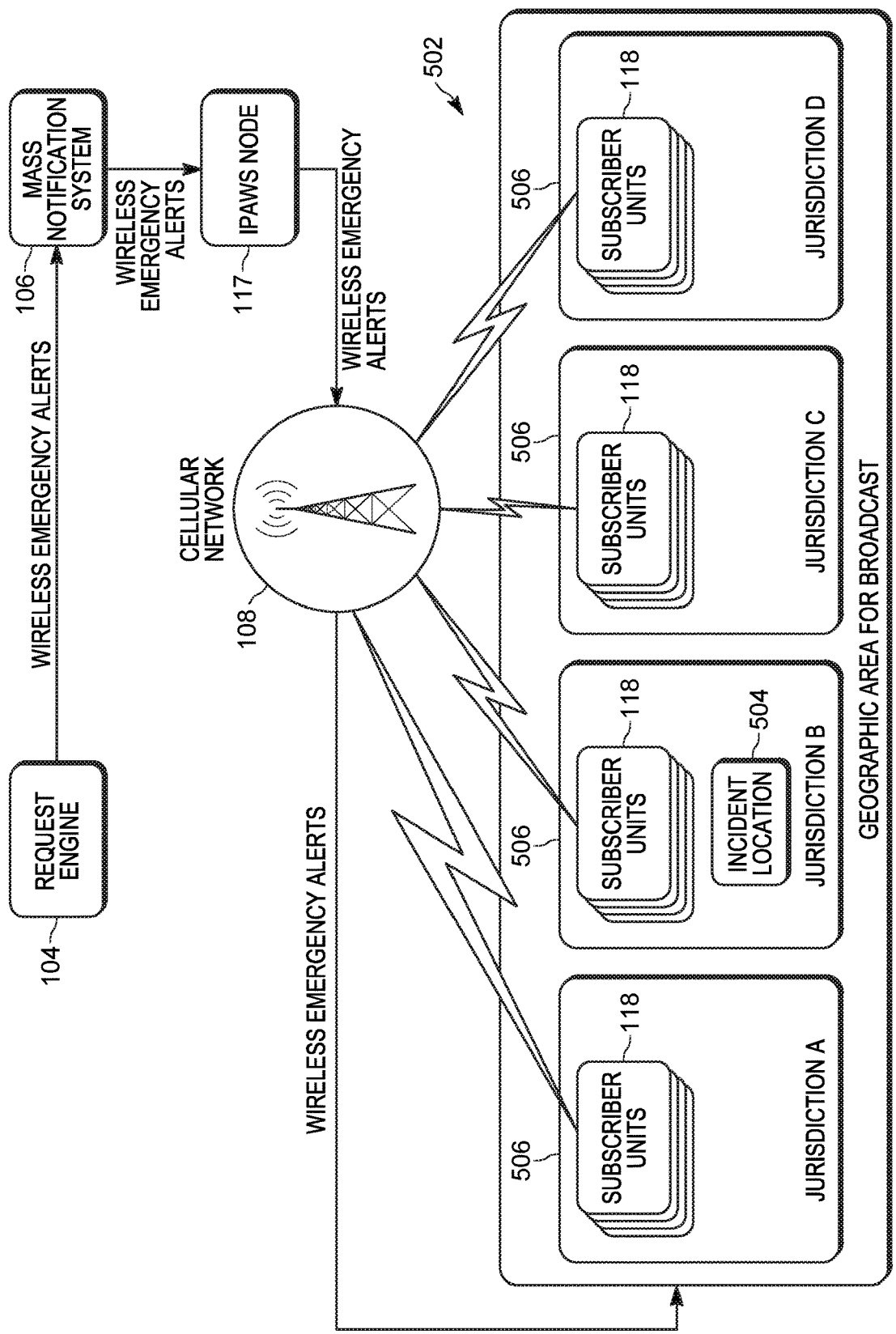
FIG. 5 illustrates aspects of the operation of the system of FIG. 1 in accordance with some embodiments.

In some embodiments, priorities are assigned to geographic mass messaging requests on a geographic basis. In such embodiments, priorities may be determined for and compared within definable subunits of geographic space (for example, a jurisdiction; a cell tower coverage area; a state, county, or municipal border; and the like), such that the highest priority message request in one subunit may override lower priorities in some subunits but not in others. For example, as illustrated in FIG. 5, the request engine 104 may receive a geographic mass messaging request to broadcast an alert into a geographic area 502. In the example, the geographic mass messaging request is based on an incident occurring at an incident location 504. As noted, broadcast areas for wireless emergency alerts may span multiple definable geographic subunits. In the example illustrated, the geographic area 502 includes some or all of the jurisdictions 506 (Jurisdiction A, Jurisdiction B, Jurisdiction C, and Jurisdiction D). In one example, a geographic mass messaging request based on the incident occurring at the incident location 504 my be assigned the highest priority (for example, a priority of 8.5 on a 10 point scale) in Jurisdiction B (for example, because it occurred in that jurisdiction and because it had a high computer-aided dispatch assigned incident priority (as described herein). However, when the geographic mass messaging request is evaluated for Jurisdictions A, C, and D, it may not be assigned the same priority, due to differences between the jurisdictions. For example, Jurisdiction D may operate using different policies from Jurisdictions A, B, and C (as described herein), and may assign a lower priority to the geographic mass messaging request as a result. In that example, the wireless emergency alert would be broadcast to the subscriber units 118 in Jurisdictions A, B, and C, but not to the subscriber units 118 in Jurisdiction B. Alternatively, or in addition, a difference in priorities across geographic subunits of the geographic area 502 may trigger the generation of a request modification proposal, as described herein.

When the priority does not meet the priority threshold (at block 306), the electronic processor 210 may deny the request or offer to send the message under different circumstances than was requested. The electronic processor 210 then transmits either a request denied message or a request modification proposal (for example, via the transceiver 230) to the requesting agency, at block 308. For example, the electronic processor 210 may transmit an electronic message noting that that the geographic mass messaging request did not meet the priority threshold and will not be sent.

In some embodiments, in response to determining that the priority does not meet the priority threshold, the electronic processor 210 determines a request modification proposal for the request characteristics based on the alerting authority policy, the current state of the mass notification system, or both. For example, when a geographic mass messaging request characteristic is a timing window and the geographic reference includes a geofence, a low priority is determined because the area bounded by the geofence has received several alerts recently. In one example, when a threshold number of alerts over a time period (for example, 1 alert within the last hour, 3 alerts within the last 4 hours, 5 alerts withing the last 8 hours, or 10 alerts within the last 24 hours) is reached, subsequent alert requests for the same area are assigned a lower priority that they might otherwise be assigned had the threshold not been met. In this example, the request modification proposal includes a choice between transmitting the message during the requested timing window based on an adjusted geofence (to transmit the request sooner, but over a smaller geographic area by eliminating the portions of the originally proposed geofence that have already received recent alerts) and transmitting the message based on the originally proposed geofence, but during an adjusted timing window (to transmit the request across all of the originally proposed geofence, but at a later time). The adjusted timing window may be based on an existing queued message having a higher priority than the requested message, an existing queued message having an overlapping geofence relative to the geofence for the requested message, or an existing queued message having an overlapping timing window relative to the timing window for the requested message. Similarly, the adjusted geofence may be based on an existing queued message having a higher priority than the requested message, an existing queued message having an overlapping geofence relative to the geofence for the requested message, or an existing queued message having an overlapping timing window relative to the timing window for the requested message.

When the priority meets or exceeds the priority threshold (at block 306), the electronic processor 210 transmits the message (for example, via the transceiver 230) to the mass notification system 106 for broadcast to end user devices in a specified geographic region based on the geographic reference (at block 310). For example, the electronic processor 210 may format the message as a wireless emergency alert and transmit it to the mass notification system 106 using the Organization for the Advancement of Structured Information Standards (OASIS) Common Alerting Protocol (CAP). At block 312, the electronic processor 210 transmits a request granted message (for example, via the transceiver 230) to the requesting agency. The request granted message alerts the requesting agency that their request was granted and that a wireless emergency alert was sent based on the parameters requested by the requesting agency.

In some embodiments, when multiple requests meet or exceed the priority threshold, the request engine 104 compares the priorities for those requests before transmitting any of the requests. For example, the electronic processor 210 receives a second geographic mass messaging request via the transceiver, the second geographic mass messaging request including a second message, a second geographic reference, and a second requesting agency identifier, and having at least one second request characteristic. In a similar way to the first request, the electronic processor 210 assigns a second priority to the second geographic mass messaging request based on an alerting authority policy and at least one selected from the group consisting of the second requesting agency, the second geographic reference, and the at least one second request characteristic. The electronic processor 210, in response to determining that the priority meets a priority threshold and that the second priority meets the priority threshold, compares the first priority to the second priority. The electronic processor 210 then transmits, based on the comparison, either the message or the second message to the mass notification system 106 (for example, the message having the higher priority).

In some embodiments, two priority thresholds are used to control the transmission of wireless emergency alerts based on geographic mass messaging requests. In some embodiments, the request engine 104 uses a machine learning algorithm to analyze historical geographic mass messaging request and transmission patterns for a time period to determine the second priority threshold. For example, where past request and transmission patterns for past occurrences of the current time period (for example, between 8 pm and midnight on a Saturday) indicate that higher priority requests can be expected, the second priority threshold may be set high enough above the first priority threshold that it prevents lower priority messages from being transmitted, effectively reserving space on the system for the expected higher priority requests.

In such embodiments, the electronic processor 210, responsive to determining that the priority meets the priority threshold and that a timing window for the geographic mass messaging request falls within the time period, compares the priority to the second priority threshold. In response to determining that the priority does not meet the second priority threshold, the electronic processor 210 transmits a request delayed message to the requesting agency. The request delayed message indicates that the message cannot be sent as requested but may be transmitted at a later time.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms for example, first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

It should also be understood that although certain examples depict components as logically separate, such depiction is merely for illustrative purposes. In some embodiments, the illustrated components may be combined or divided into separate software, firmware and/or hardware. Regardless of how they are combined or divided, these components may be executed on the same computing device or may be distributed among different computing devices connected by one or more networks or other suitable communication means.

In addition, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A system for transmitting geographic mass messaging requests, the system comprising:
   a memory;
   a transceiver; and
   an electronic processor communicatively coupled to the memory and the transceiver, and configured to
   receive a geographic mass messaging request via the transceiver, the geographic mass messaging request including a message, a geographic reference, and a requesting agency identifier, and having at least one request characteristic;

assign a priority to the geographic mass messaging request based on an electronically stored alerting authority policy and at least one selected from the group consisting of the requesting agency identifier, the geographic reference, and the at least one request characteristic;

responsive to determining that the priority meets a priority threshold, transmit the message via the transceiver to a mass notification system for broadcast to end user devices in a specified geographic region based on the geographic reference; and transmit a request granted message via the transceiver to the requesting agency; and responsive to determining that the priority does not meet the priority threshold, transmit one of a request denied message and a request modification proposal via the transceiver to the requesting agency.

2. The system of claim 1, wherein the electronic processor is configured to:

receive a second geographic mass messaging request via the transceiver, the second geographic mass messaging request including a second message, a second geographic reference, and a second requesting agency identifier, and having at least one second request characteristic;

assign a second priority to the second geographic mass messaging request based on an alerting authority policy and at least one selected from the group consisting of the second requesting agency, the second geographic reference, and the at least one second request characteristic;

responsive to determining that the priority meets a priority threshold and that the second priority meets the priority threshold, compare the first priority to the second priority; and transmit, based on the comparison, either the message or the second message to the mass notification system.

3. The system of claim 1, wherein the electronic processor is configured to:

responsive to determining that the priority does not meet the priority threshold, determine the request modification proposal for the at least one request characteristic based on at least one selected from the group consisting of the alerting authority policy and a current state of the mass notification system.

4. The system of claim 3, wherein the at least one request characteristic includes a timing window;

the geographic reference includes a geofence; and the request modification proposal includes a choice between transmitting the message during the timing window based on an adjusted geofence, and transmitting the message based on the geofence, but during an adjusted timing window.

5. The system of claim 4, wherein the adjusted timing window is based on at least one selected from the group consisting of an existing queued message having a higher priority than the message, an existing queued message having an overlapping geofence relative to the geofence, and an existing queued message having an overlapping timing window relative to the timing window.

6. The system of claim 4, wherein the adjusted geofence is based on at least one selected from the group consisting of an existing queued message having a higher priority than the message, an existing queued message having an overlapping geofence relative to the geofence, and an existing queued message having an overlapping timing window relative to the timing window.

7. The system of claim 1, wherein the electronic processor is configured to:

determine, using a machine learning algorithm, a second priority threshold based on historical geographic mass messaging request and transmission patterns for a time period;

responsive to determining that the priority meets the priority threshold and that a timing window for the geographic mass messaging request falls within the time period, compare the priority to the second priority threshold; and responsive to determining that the priority does not meet the second priority threshold, transmit a request delayed message via the transceiver to the requesting agency.

8. The system of claim 1, wherein the at least one request characteristic is at least one selected from the group consisting of an evidence request policy, a timing window, an incident type, and at least one existing queued message having a shared request characteristic with the geographic mass messaging request.

9. The system of claim 1, wherein the geographic reference is at least one selected from the group consisting of a geofence, an incident location, a location of a requesting device, and a location based on the requesting agency identifier.

10. The system of claim 1, wherein the requesting agency identifier is one selected from the group consisting of an absolute agency identifier and an agency type identifier.

11. A method for transmitting geographic mass messaging requests, the method comprising:

receiving a geographic mass messaging request via a transceiver, the geographic mass messaging request including a message, a geographic reference, and a requesting agency identifier, and having at least one request characteristic;

assigning, with an electronic processor, a priority to the geographic mass messaging request based on an electronically stored alerting authority policy and at least one selected from the group consisting of the requesting agency identifier, the geographic reference, and the at least one request characteristic; and responsive to determining that the priority does not meet a priority threshold, transmitting one of a request denied message and a request modification proposal via the transceiver to the requesting agency.

12. The method of claim 11, further comprising:

responsive to determining that the priority meets the priority threshold, transmitting the message via the transceiver to a mass notification system for broadcast to end user devices in a specified geographic region based on the geographic reference; and transmitting a request granted message via the transceiver to the requesting agency.

13. The method of claim 12, further comprising:

receiving a second geographic mass messaging request via the transceiver, the second geographic mass messaging request including a second message, a second geographic reference, and a second requesting agency identifier, and having at least one second request characteristic;

assigning a second priority to the second geographic mass messaging request based on an alerting authority policy and at least one selected from the group consisting of the second requesting agency, the second geographic reference, and the at least one second request characteristic;

responsive to determining that the priority meets the priority threshold and that the second priority meets the priority threshold, comparing the first priority to the second priority; and transmitting, based on the comparison, either the message or the second message to the mass notification system.

14. The method of claim 12, further comprising:

determining, using a machine learning algorithm, a second priority threshold based on historical geographic mass messaging request and transmission patterns for a time period;

responsive to determining that the priority meets the priority threshold and that a timing window for the geographic mass messaging request falls within the time period, comparing the priority to the second priority threshold; and responsive to determining that the priority does not meet the second priority threshold, transmitting a request delayed message via the transceiver to the requesting agency.

15. The method of claim 11, further comprising:

responsive to determining that the priority does not meet the priority threshold, determining the request modification proposal for the at least one request characteristic based on at least one selected from the group consisting of the alerting authority policy and a current state of the mass notification system.

16. The method of claim 15, wherein the at least one request characteristic includes a timing window;

the geographic reference includes a geofence; and determining the request modification proposal includes determining a choice between transmitting the message during the timing window based on an adjusted geofence, and transmitting the message based on the geofence, but during an adjusted timing window.

17. The method of claim 16, wherein the adjusted timing window is based on at least one selected from the group consisting of an existing queued message having a higher priority than the message, an existing queued message having an overlapping geofence relative to the geofence, and an existing queued message having an overlapping timing window relative to the timing window.

18. The method of claim 16, wherein the adjusted geofence is based on at least one selected from the group consisting of an existing queued message having a higher priority than the message, an existing queued message having an overlapping geofence relative to the geofence, and an existing queued message having an overlapping timing window relative to the timing window.

19. The method of claim 11, wherein the at least one request characteristic is at least one selected from the group consisting of an evidence request policy, a timing window, an incident type, and at least one existing queued message having a shared request characteristic with the geographic mass messaging request.

20. The method of claim 11, wherein the geographic reference is at least one selected from the group consisting of a geofence, an incident location, a location of a requesting device, and a location based on the requesting agency identifier.

* * * * *